US006713896B1

(12) United States Patent
Burtscher et al.

(10) Patent No.: US 6,713,896 B1
(45) Date of Patent: Mar. 30, 2004

(54) METHOD AND APPARATUS FOR SWITCHING SEVERAL ELECTRIC CIRCUITS

(75) Inventors: Hans Burtscher, Waiblingen (AU); Uwe Probst, Orsingen-Neuzingen (DE); Boris Wiegand, Bebra (DE); Jochen Pfeiffer, Karlsruhe (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 53 days.

(21) Appl. No.: 09/913,140

(22) PCT Filed: Oct. 2, 2000

(86) PCT No.: PCT/DE00/00409

§ 371 (c)(1),
(2), (4) Date: Aug. 10, 2001

(87) PCT Pub. No.: WO00/48215

PCT Pub. Date: Aug. 17, 2000

(30) Foreign Application Priority Data

Feb. 12, 1999 (DE) .......................................... 199 06 035

(51) Int. Cl.⁷ .................................................. H02H 1/24

(52) U.S. Cl. ....................... 307/112; 307/113; 307/115; 307/9.1; 307/10.8; 200/6 B; 200/11 R

(58) Field of Search ................................ 307/113, 115, 307/10.8, 9.1, 112; 200/6 B, 11 R

(56) References Cited

U.S. PATENT DOCUMENTS

| | | | | | |
|---|---|---|---|---|---|
| 4,037,196 | A | * | 7/1977 | Atkinson et al. | 340/70 |
| 5,668,359 | A | * | 9/1997 | Alvord et al. | 200/6 B |
| 6,021,308 | A | * | 2/2000 | Kimura | 455/6.3 |

* cited by examiner

*Primary Examiner*—Brian Sircus
*Assistant Examiner*—Robert L DeBeradinis
(74) *Attorney, Agent, or Firm*—Fay, Sharpe, Fagan, Minnich & McKee, LLP

(57) ABSTRACT

The invention relates to a method for switching several electric circuits in a vehicle, wherein several positions of an actuating element are binarily coded, the binary codification is fed to a logic and the logic controls the switching of the electric circuits, and also a corresponding switch with an actuating element and a switching device for attaining several switching modes, depending upon the position of the actuating element, wherein the switching device is constructed of several switching elements with two switching modes each, so that there results a binary codification of the switching modes of all switching elements, depending upon the position of the actuating element in order to switch the electric circuits by means of a logic.

23 Claims, 4 Drawing Sheets

METHOD AND APPARATUS FOR SWITCHING SEVERAL ELECTRIC CIRCUITS

BACKGROUND OF THE INVENTION

The invention relates to a method and apparatus for switching several electric circuits, particularly, circuit of a motor vehicle.

Such switching methods and switches are used in vehicle interiors for the control of a plurality of electric circuits and their associated electrically driven devices in the electrical system of the motor vehicle.

With conventional switching methods, switching contacts of a multi-position switch are directly electrically connected with the electric circuits to be switched.

Thus, the different illumination modes—parking lights, driving lights, fog lights, rear fog lights, high beams, and the like—are typically switched directly via a single multi-position switch.

Because of the high power drawn by certain electrically driven devices, for example the driving lights, it is necessary that the switching contacts for switching high power or high current in a traditional twelve volt wiring system be designed to inhibit wear and tear that can degrade functionality.

As a result of the necessary use of wear and tear inhibiting contacts for the switching of high power outputs, the cost of manufacturing such switches is high.

Therefore, it is an object of the present invention to provide a low cost and easily produced method and apparatus for the switching of several electric circuits of a vehicle.

SUMMARY OF THE INVENTION

In accordance with one embodiment of the present invention, control of the electric circuits of the electrical devices is not effectuated directly, but rather indirectly by means of binary codification of the positions of an actuation element by means of switching elements, e.g. micro-switches, which are not required to switch high output power.

The binary coding permits utilization of cost-effective logic modules, such as gate or processor logic, which in turn controls the electric circuits via known, low-loss, cost-effective electrical switching and or control elements such as thyristors, triacs and the like.

As a result, the use of cost-effective switches for low output power is made possible. In addition, due to the binary codification standard, cost-effective, mass-produced components can be used in the switch for a vast range of applications, inasmuch as the specific switching functions of the electric circuits are determined by the logic. Such logic may includes, for example, a gate or logic arrays, possibly programmable logic arrays, or processor logic.

These logic modules are selectively arranged at or in the switch as desired, at least during the manufacturing process, so that they can be easily exchanged.

It is, however, also contemplated that the binary codification of the switch and/or the position of its actuating element are fed via a bus system to a central logic, e.g. an on-board computer, which is also responsible for the control of additional electronic functions.

In accordance with another aspect of the present invention, the number of the coding possibilities is greater than the number of the positions of the actuating element or the desired switching modes. The redundant codification possibilities can be employed for a redundancy verification of the positions of the actuating element, or for verifying a particular switching functions.

For example, a switching element serving as a redundancy switch is additionally activated by the actuating element via a profile disk in the position of a certain mode (e.g., "0" or "1" position) to which the certain mode, which is codified, such as "driving light on" has already been switched on via the other switching elements. The dual activation of a certain switching function is linked by a logical OR-gate, so that only one activation suffices—i.e. either the redundancy switch or the other (codified) switches—for switching on the given mode, e.g. the exemplary "driving light on" mode.

It is thereby possible to ensure that a safety-related function or feature such as "driving light on" operates properly despite a switch malfunction due to the redundancy. It is, of course, also possible to employ other redundancy principles as desired, rather than the described redundancy switch.

For example, it is possible to actuate the switch elements or micro-scanners via the profile disks in such a manner that each codification combination is distinguished by at least two bits from a neighboring combination (e.g., 0000, 0011, 0101, 1000, etc.) or even a randomly chosen combination. The randomly allowed combination or change is then be by a logic circuit which, in case of a dual redundancy, selectively correctively intervene and/or trigger an alarm.

Additional benefits and advantages of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
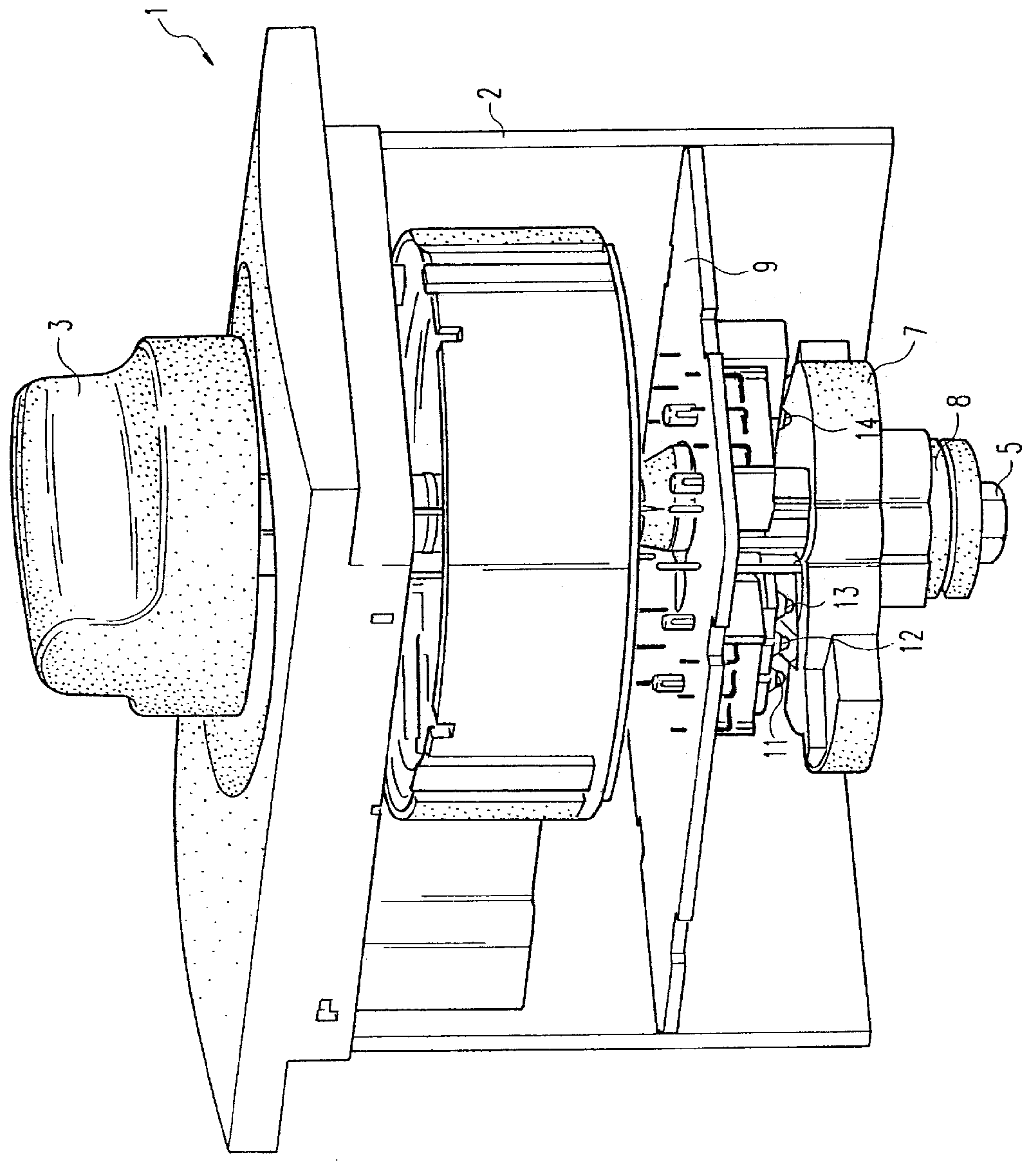
FIG. 1 shows a perspective view of a rotational light switch in accordance a first embodiment of the invention.

With reference to FIG. 1, the turning light switch 1 includes a knob 3 disposed on its upper side, which can be manually operated by a user. The knob 3 is rigidly affixed, in detachable fashion, on the end of a shaft 5 that protrudes from a housing 2.

The shaft 5 swivels or turns and is also longitudinally displaceable with respect to the upper- and under-side of the housing 2. A bottom plate 9 is arranged in stationary fashion in a middle region of the inside of the housing 2. The shaft 5 extends vertically through a central opening in the bottom plate 9. The opening is larger than the outer dimensions of the shaft segment that passes therethrough. A profile disk 7 is arranged on the shaft 5 below the bottom plate 9 in a twist-proof and longitudinally displaceable fashion. To effectuate the twist-proof and longitudinally displaceable arrangement of the profile disk 7 on the shaft 5 the profile disk 7 includes a central hexagonally-shaped opening that receives a segment of the shaft 5 that has a hexagonal outer exterior. The hexagonally-shaped opening has corresponding or slightly larger dimensions relative to the hexagonally-shaped shaft segment.

Below the profile disk 7, the shaft 5 passes through a pivot casing 8 comprising a hollow cylindrical body that is arranged in stationary fashion in the housing 1 or disposed on the underside of the housing 1. The shaft 5 swivels or turns and is longitudinally displaceable within the pivot casing 8. The upper or front side of the casing 8 provides a lower fixed limiting stop for the underside of the profile disk 7. The upper side of the profile disk 7 impinges upon the contacts of a plurality of micro-switches 11, 12, 13, 14, or impinges upon the micro-switches 11, 12, 13, 14 by means of a spring force. As a result, the profile disk 7 is fixedly positioned in the longitudinal direction in the housing, in spite of the longitudinal displaceability of the shaft 5. In order to precisely position of the profile disk 7, it is also contemplated that the profile disk 7 be arranged at the casing 8 in a rotatable but longitudinally stationary fashion by means of a bayonet catch (not shown).

The shaft 5 is limited against removal by an operator pulling on the knob 3 by means of recesses and projections (not shown) on the shaft 5 and elements cooperating with the same which are fixedly arranged on the housing 2.

Conversely, the shaft 5 can be inserted only to the point where the underside of the knob 3 rests against the exterior of the upper side of the housing 2.

In this fashion, the shaft 5 can be pulled-out or pushed-in within defined longitudinal limits without longitudinally displacing the profile disk 7.

Figure 2:
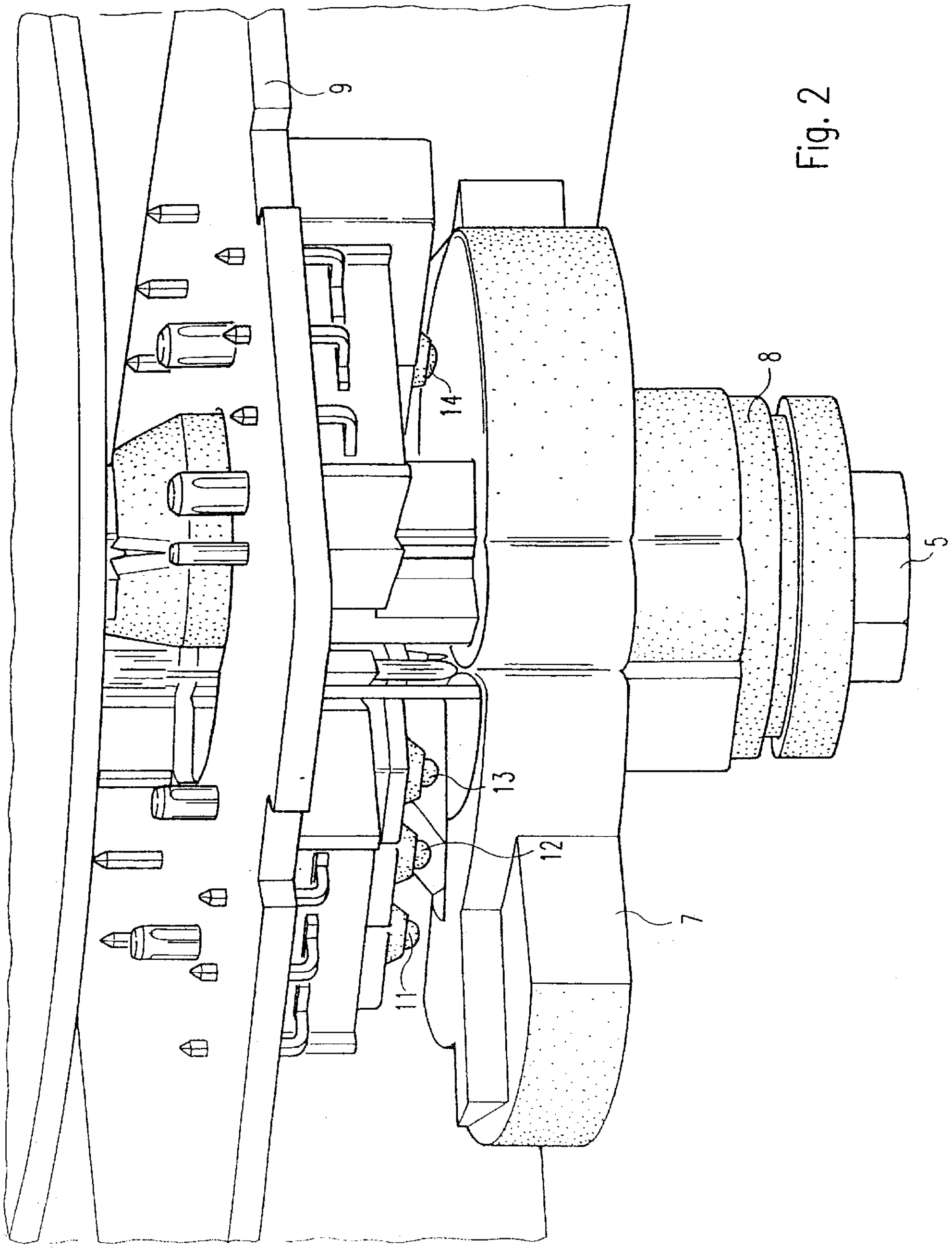
FIG. 2 shows an enlarged view of the lower section of the turning light switch of FIG. 1.

With reference next to FIG. 2, the profile disk 7 includes a profile consisting of projections and recesses disposed on an upper side of the profile disk 7 and facing the bottom plate 9. The projections and recesses comprising the profile effectuate selective actuation of the micro-switches 11, 12, 13, 14.

Figure 3:
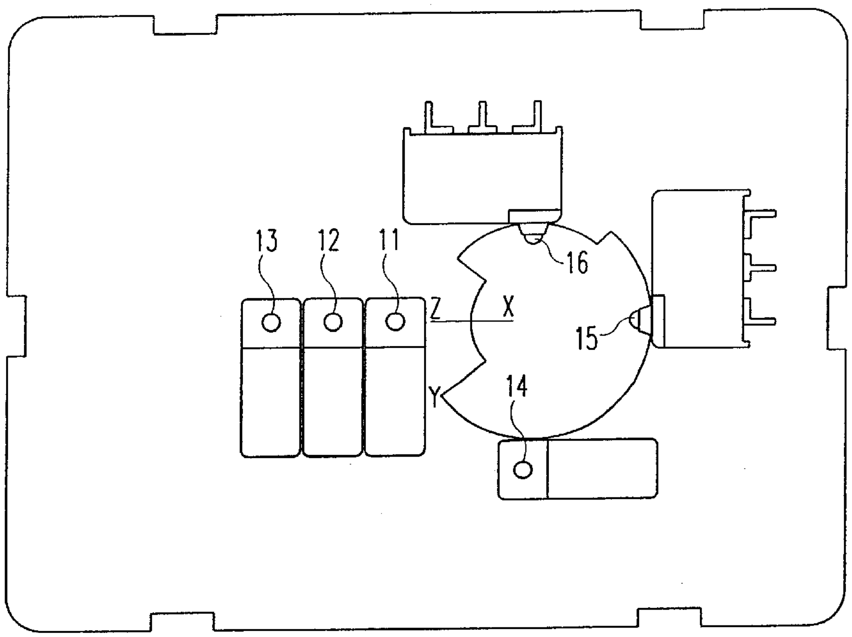
FIG. 3 shows a top view of a bottom plate of a rotational light switch in accordance with anther embodiment of the invention.
Figure 4:
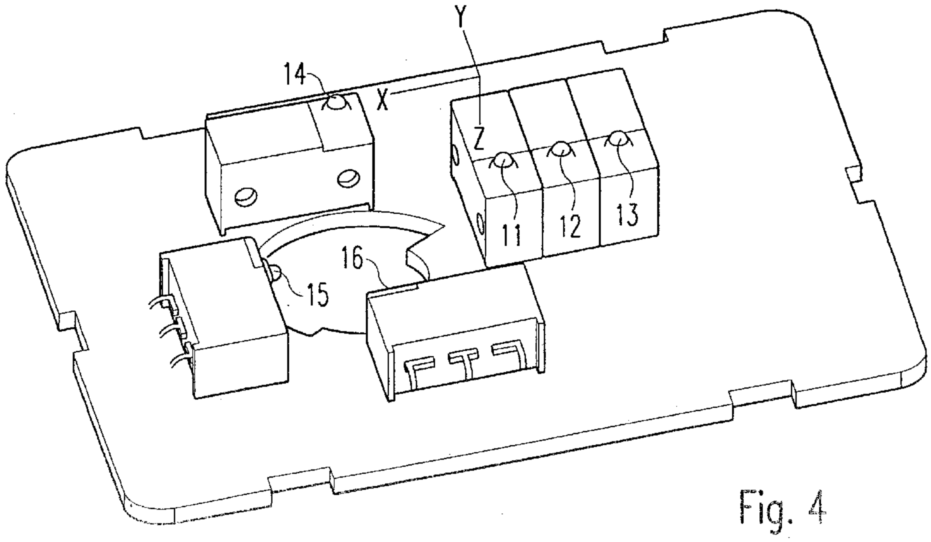
FIG. 4 shows a perspective view of the bottom plate of FIG. 3.

For that purpose, the micro-switches 11, 12, 13, 14 can be arranged tangentially, as shown in FIGS. 1 and 2, or the micro-switches 11, 12, 13, 14 can be arranged in a radial direction, as shown in FIGS. 3 and 4. The configuration of the micro-switches 11, 12, 13, 14 cooperates with the arrangement of the profile of the profile disk 7 to effectuate the desired switching characteristics of the micro-switches 11, 12, 13, 14.

By appropriate cooperation between the surface profile of the profile disk 7 and the spring-mounted contacts of the micro-switches 11, 12, 13, 14 it is possible, for example, to effectuate a switching characteristic as shown in the Table below:

| Position of Turning Knob | Function | Switch 11 | Switch 12 | Switch 13 | Switch 14 |
|---|---|---|---|---|---|
| I | Parking Light Left | 1 | 0 | 1 | 1 |
| II | Parking Light Right | 1 | 1 | 0 | 1 |

-continued

| Position of Turning Knob | Function | Switch 11 | Switch 12 | Switch 13 | Switch 14 |
|---|---|---|---|---|---|
| III | Automatic Driving Light | 1 | 0 | 0 | 1 |
| IV | Light Off | 0 | 0 | 0 | 1 |
| V | Stationary Light | 0 | 1 | 0 | 1 |
| VI | Driving Light | 0 | 1 | 1 | 0 |

Figure 5:
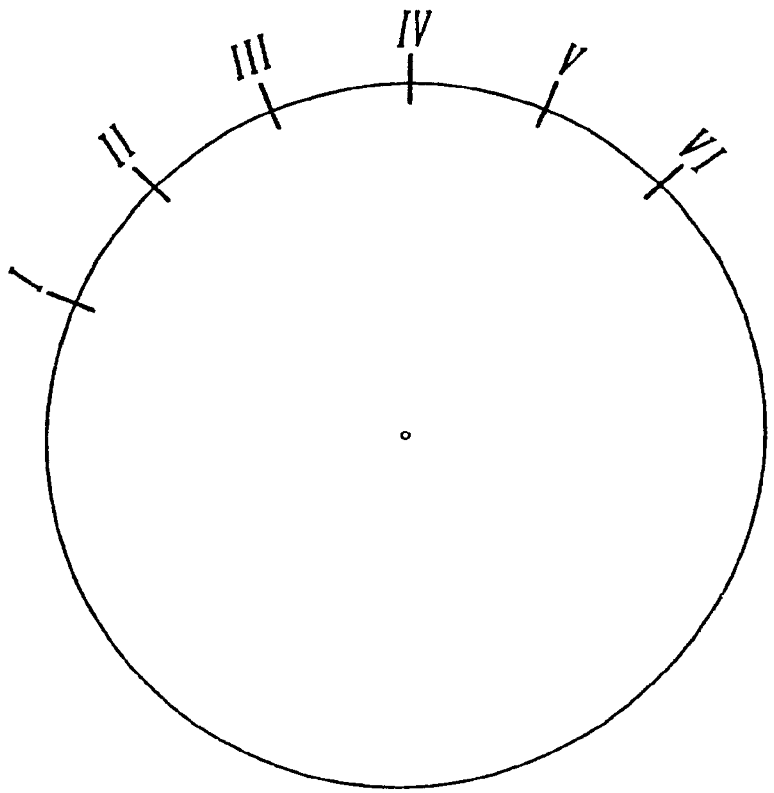
FIG. 5 shows a schematic representation of the switching positions of a the subject light switch.

With reference to FIG. 5, knob positions I through VI are represented schematically. These knob positions correspond to the position or combination of the micro-switches 11, 12, 13, 14 shown in the Table. In the exemplary binary codification of the switch positions shown above, the switch 14 acts as a redundancy switch, which contributes toward guaranteeing a particularly important function, e.g. the driving light or the dimmer light against malfunction.

The function "driving light" is effectuated, in addition to the codification via the switches 11, 12, 13, by means of a "0" position (i.e., driving light active) of switch 14. The "0" position effectuating "driving light active" in the exemplary case corresponds to the mode "switch not activated" or "no current" or "conductance to ground", so that the driving light remains turned on via a logic switch by means of a logical "OR" linkage of the switch 14 with the 3-bit code corresponding to "driving light active", which in the Table corresponds to the switches 11, 12, 13 taking the values 011. A potential malfunction is thereby recognized as such and can even be indicated by a "malfunction" warning indicator. This has the advantage that a malfunction, such as a ground short circuit of one or more of the switches 11, 12, 13 (for example if, in addition, the fog light is turned on or off) will not lead to an unintended and dangerous switching-off of the driving lights.

Therefore, it is also contemplated that the redundancy function of the redundancy switch is realized in the "1" position instead of the "0" position. This permits recognition of the malfunction "short circuit" instead of "ground short circuit", since in the case of a short circuit the corresponding line is drawn to a "1" electrical potential.

The redundancy switches can, of course, be employed in combination with one another as desired, so that both malfunctions can be detected and/or switched to a permissible fault mode.

Needless to say, the binary codification of the switch positions of a multi-function switch is not limited to a 3-bit codification with an additional redundancy switch. Rather, any desired number of switch positions can be realized as a multi-bit code with one or several redundancy switches. As an example, redundancy switches can be selectively used for several safety-relevant switching functions.

The switching method according to an aspect of the invention enables cost-effective, simple construction of a switch with binary codification by means of micro-switches with low power output and optional redundancy. Instead of effectuating the redundancy as described, it is also contemplated to realize the redundancy by special codification stages. For example, redundancy can be built-in by changing at least two modes per stage, or by having redundancy for sums of digits, etc.

Control of the electric circuits is effectuated via control electronics, e.g. a logic unit and a switching unit, which are arranged in or at the switch 1, either in part or totally as desired. The control electronics are adapted for incorporation into a central controller, such as for example an on-board computer.

With reference to FIGS. 3 and 4, in addition to the micro-switches 11, 12, 13, 14 additional micro-switches 15, 16 are provided on the bottom plate 9. The micro-switches 15, 16 are preferably oriented radially inward toward the shaft 5 rather than toward the profile disk 7 as the switches 11, 12, 13, 14. The switches 15, 16 are thus actuated by means of appropriate recesses and projections on the surface of the shaft 5. This is done, for example, by a rotation or by longitudinal displacement of the shaft 5. In the embodiment of FIGS. 3 and 4, the switches 15, 16 serve for detection of a two-stage pull-out or push-in of the shaft 5 which actuates corresponding switching functions, such as fog lights and/or rear fog lights in the described example application.

In order to ensure convenient operation of the switch 1, catch indices or catch elements (not shown) are arranged in the switch 1. These indices or elements ensure mechanical latching at selected rotational and longitudinal positions of the switch 1. Such catch elements or catch indices are well known to those of ordinary skill in the art and need not be illustrated herein for an enabling disclosure of the invention.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for switching electric circuits, comprising:

binarily encoding a plurality of positions of an actuating element, at least one of said plurality of positions of the actuating element having a redundant encoding;

transmitting the binary encoding and redundant encoding to a logic unit; and switching the electric circuits based upon an output of the logic unit.

2. The method according to claim 1, wherein the transmitting of the binary codification to a logic unit includes transmitting the binary codification to said logic unit via a bus system.

3. The method according to claim 1, further comprising:

controlling additional electrical functions based upon additional outputs of the logic unit.

4. The method according to claim 1, further comprising:

verifying that the binary codification corresponds to a valid position of the actuating element.

5. The method according to claim 4, wherein the verifying includes:

comparing the binary codification against a subset of binary combinations, said subset including the binary combinations that correspond to positions of the actuating element, the number of combinations comprising said subset being less than $2^n$ where n is the number of binary bits.

6. A switch for selectively switching a plurality of associated electric circuits, the switch comprising:

an actuating element having a plurality of selectable positions;

a plurality of binary switching elements, each binary switching element defining a binary bit value based on the position of the actuating element;

a binary codification defined by the binary bit values of the plurality of switching elements;

a logic unit adapted to receive the binary codification and selectively switch the plurality of associated electric circuits based on the binary codification;

a redundancy binary switching element defining a redundancy binary value; and a logical "OR" element in communication with the logic unit and defining a relationship between the binary codification and the redundancy binary value to protect at least one switch Position independent of the binary bit values of the plurality of binary switching elements.

7. The switch as set forth in claim 6, wherein the plurality of binary switching elements further include a plurality of low-power micro-switches.

8. The switch as set forth in claim 6, wherein the actuating element further includes:

a knob;

a shaft operatively connected with the knob; and a profile disk, operatively connected with the shaft, the profile disk being cooperative with the plurality of binary switching elements to select the binary bit values defined by the binary switching elements.

9. The switch as set forth in claim 8, wherein the actuating element further includes:

a twist-proof and longitudinally displaceable operative connection between the shaft and the profile disk.

10. The switch as set forth in claim 6, wherein the logic unit further includes:

one of an electronic controller and an on-board computer.

11. A vehicle lighting controller for selectively applying electrical power to a plurality of lighting systems of a vehicle, said plurality of lighting systems including a driving lights system, the vehicle lighting controller comprising:

an actuating element having a plurality of manually selectable positions;

a plurality of low-power binary switches communicating with the actuating element to define an ordered combination of bits corresponding to the actuating element position;

an electronic controller that receives the ordered combination of bits and effectuates application of electrical power to selected lighting systems based on the ordered combination of bits;

at least one redundancy element that acquires a fault value conditional upon one of an electrical short and an electrical ground short occurring in the vehicle lighting controller; and a safety element that effectuates application of electrical sower to the driving lights system conditional upon the at least one redundancy element acquiring the fault value independent of a logical condition of said ordered combination of bits.

12. The vehicle lighting controller as set forth in claim 11, wherein the at least one redundancy element further includes a low power binary switch.

13. The vehicle lighting controller as set forth in claim 11, wherein the electronic controller further includes an on-board computer.

14. The vehicle lighting controller as set forth in claim 11, wherein the actuating element further includes:

a knob;

a shaft connected with the knob; and a profile disk operatively connected with the shaft and having a plurality of selectable orientations relative to the switches, the orientations corresponding to the plurality of manually selectable positions of the actuating element, the profile disk further having a surface profile that selectively operates the plurality of low-power switches to effectuate definition of the ordered combination of bits.

15. The vehicle lighting controller as set forth in claim 14, wherein the actuating element further includes:

a housing inside which the shaft is mounted in a swivelable and axially translatable fashion.

16. The vehicle lighting controller as set forth in claim 15, wherein the plurality of manually selectable positions of the actuating element include:

a plurality of manually selectable positions of the shaft, wherein each of the plurality of shaft positions is defined by a swivel position and an axial translation position.

17. A method for switching a plurality of lighting circuits of a vehicle comprising:

binary-coding a plurality of positions of an activation element;

delivering the binary coding to a logic device, the logic device controlling the switching of the circuits; and, predominantly protecting at least one position of the activation element and as a result of a malfunction is detected.

18. The method according to claim 17 wherein the coding is read out from the logic device via a bus system.

19. The method according to claim 18 wherein the logic device is embodied as a central logic device for controlling further electrical functions and their respective circuits.

20. A light switch for a vehicle comprising:

an activation element and a switching device for bringing about a plurality of switched states as a function of the position of the activation element the switching device including a plurality of switching elements with two switched states each so that a binary coding of the switched states of all the switching elements results as a function of the position of the activation element in order to switch the circuits by means of a logic device, the switching device having at least one further switching element for at least one position of the activation element in order to protect at least one position independently of the switched states of the other switching elements.

21. The switch according to claim 20 wherein the switching elements include low power microswitches.

22. The switch according to claim 21 wherein the activation element includes as a rotary knob which is connected via an axle to a profiled disk for activating the switching element.

23. The switch according to claim 22 wherein the profiled disk is mounted on the axle so as to be fixed in terms of rotation and capable of displacement in the longitudinal direction so that the rotary knob can be pulled out and pushed its axis of rotation in order to activate further switching elements.

* * * * *